(12) United States Patent
Agnew et al.

(10) Patent No.: US 11,511,953 B2
(45) Date of Patent: *Nov. 29, 2022

(54) GRAIN SPREADING DEVICE

(71) Applicant: Agnew Steel, Inc., Moffit, ND (US)

(72) Inventors: Dennis E. Agnew, Moffit, ND (US); Tricia M. Fossum, Moffit, ND (US)

(73) Assignee: Agnew Steel, Inc., Moffit, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/697,146

(22) Filed: Mar. 17, 2022

(65) Prior Publication Data

US 2022/0204289 A1 Jun. 30, 2022

Related U.S. Application Data

(63) Continuation of application No. 17/144,260, filed on Jan. 8, 2021, now Pat. No. 11,279,572, which is a continuation of application No. 16/659,841, filed on Oct. 22, 2019, now Pat. No. 10,889,455.

(51) Int. Cl.
| | |
|---|---|
| *B65G 69/04* | (2006.01) |
| *E04H 7/22* | (2006.01) |
| *A01F 25/16* | (2006.01) |
| *A01F 25/18* | (2006.01) |
| *B65G 65/32* | (2006.01) |

(52) U.S. Cl.
CPC ........ *B65G 69/0441* (2013.01); *A01F 25/163* (2013.01); *A01F 25/186* (2013.01); *B65G 65/32* (2013.01); *E04H 7/22* (2013.01)

(58) Field of Classification Search
CPC ................ B65G 69/0441; B65G 65/32; B65G 69/0458; A01F 25/186; A01F 25/14; A01F 25/163; A01F 25/18
See application file for complete search history.

(56) References Cited

U.S. PATENT DOCUMENTS

| | | |
|---|---|---|
| 3,045,840 A | 7/1962 | Donelson, Jr. |
| 3,390,918 A | 7/1968 | Reinke |
| 3,563,476 A | 2/1971 | Donelson, Jr. |
| 3,966,124 A | 6/1976 | Sukup |
| 4,031,929 A | 6/1977 | Cobb |
| 4,164,327 A | 8/1979 | Clark |
| 4,342,532 A | 8/1982 | Voegele |
| 4,611,965 A | 9/1986 | Dixon |

(Continued)

OTHER PUBLICATIONS https://www.agnewsteel.com/wp-content/uploads/2017/07/Agnew-Grain-Spreader-Assembly-and-Installation-Instructions.pdf; Agnew Grain Spreader Manual; Jul. 2017.

*Primary Examiner* — James R Bidwell
(74) *Attorney, Agent, or Firm* — Neustel Law Offices (57) ABSTRACT

A grain spreading device for evenly distribute grain as it is poured into a storage bin. The grain spreading device generally includes a flow-control ring (e.g., an evenflow ring) adapted to be positioned below a grain bin opening, the flow-control ring comprising an upper opening and a bottom, and a cone movably suspended below the flow-control ring by a plurality of springs to create a variable opening between the cone and the bottom of the flow-control ring, the plurality of springs creating a restoring force, wherein the variable opening increases in size when a weight of grain on the cone moves the cone away from the bottom of the flow-control ring against the restoring force of the plurality of springs.

20 Claims, 12 Drawing Sheets

(56) References Cited

U.S. PATENT DOCUMENTS

| | | |
|---|---|---|
| 5,372,467 A | 12/1994 | Harris |
| 6,991,415 B1 | 1/2006 | Anschultz |
| 7,946,796 B2 | 5/2011 | Halland |
| 8,708,632 B2 | 4/2014 | Toline |
| 9,795,087 B2 | 10/2017 | Ward |
| 10,889,455 B1 | 1/2021 | Agnew |
| 10,894,677 B2 | 1/2021 | Honeck |
| 11,279,572 B2 * | 3/2022 | Agnew .............. B65G 69/0441 |
| 11,330,765 B2 * | 5/2022 | Kibbe ................ B65G 69/0441 |
| 2012/0237322 A1 | 9/2012 | Toline |
| 2020/0130965 A1 | 4/2020 | Kibbe |

* cited by examiner

GRAIN SPREADING DEVICE

CROSS REFERENCE TO RELATED APPLICATIONS

The present application is a continuation of U.S. application Ser. No. 17/144,260 filed on Jan. 8, 2021 which issues as U.S. Pat. No. 11,279,572 on Mar. 22, 2022, which is a continuation of U.S. application Ser. No. 16/659,841 filed on Oct. 22, 2019 now issued as U.S. Pat. No. 10,889,455. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a grain spreading device for evenly distributing grain in a grain storage bin.

Related Art

Any discussion of the related art throughout the specification should in no way be considered as an admission that such related art is widely known or forms part of common general knowledge in the field.

Devices for spreading grain as it is being poured into a grain storage bin have been in use for years. However, existing or conventional spreaders must typically be adjusted for a particular flow rate, and such adjustment must be made if the flow rate is subsequently changed. If the flow rate is not accommodated by the spreader, for example, if it is too high, the grain may simply overflow the spreader and spill into the center of the bin, which is the very condition the spreader is designed to prevent. In addition, some spreaders are sensitive to the angle and location at which grain is delivered to the spreader, and require grain to be delivered to the center of the spreader, and flowing straight down.

SUMMARY

An example embodiment is directed to a grain spreading device. The grain spreading device includes a flow-control ring (e.g., an even-flow ring) adapted to be positioned below a grain bin opening, the flow-control ring comprising an upper opening and a bottom, and a cone movably suspended below the flow-control ring by a plurality of springs to create a variable opening between the cone and the bottom of the flow-control ring, the plurality of springs creating a restoring force, wherein the variable opening increases in size when a weight of grain on the cone moves the cone away from the bottom of the flow-control ring against the restoring force of the plurality of springs.

In an example embodiment of the grain-spreading device, the flow-control ring may be suspended from the grain bin opening by a plurality of hooks. In some example embodiments, each spring of the plurality of springs may be connected between an ear proximate the upper opening of the flow-control ring and a mounting point on the cone.

In still other embodiments of the grain-spreading device, the cone may include a plurality of channels and a plurality of peaks between the channels, each channel comprising an upper surface, wherein the variable opening comprises a plurality of gaps between the bottom of the flow-control ring and the upper surfaces of the channels, wherein each mounting point is proximate to one of the plurality of peaks. Some embodiments may further comprise a plurality of legs attached to and extending away from the cone, wherein each leg has a first end aligned with one of the plurality of channels. Further, each leg may be pivotably attached to the cone such that the angle of each leg relative to the cone is adjustable.

In some example embodiments of the grain-spreading device the cone is attached to a guide assembly that is slidably positioned on an interior of the flow-control ring, and the guide assembly maintains an orientation of the cone relative to the flow-control ring. The guide assembly may comprise a plurality of upright guides, and each upright guide may further comprise a contact member positioned between the upright guide and an inner surface of the flow-control ring.

In still further embodiments, the grain-spreading device may include a means for creating a variable opening proximate the bottom of the flow-control ring, wherein the variable opening increases in size when a weight of grain inside the flow-control ring increases.

There has thus been outlined, rather broadly, some of the embodiments of the grain spreading device in order that the detailed description thereof may be better understood, and in order that the present contribution to the art may be better appreciated. There are additional embodiments of the grain spreading device that will be described hereinafter and that will form the subject matter of the claims appended hereto. In this respect, before explaining at least one embodiment of the grain spreading device in detail, it is to be understood that the grain spreading device is not limited in its application to the details of construction or to the arrangements of the components set forth in the following description or illustrated in the drawings. The grain spreading device is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

An example grain spreading device 10 generally comprises a flow-control ring 20 (e.g., an "evenflow" ring) adapted to be positioned below a grain bin opening 81, the flow-control ring 20 including an upper opening 22 and a bottom 24, and a cone 30 movably suspended below the flow-control ring 20 by a plurality of springs 40 to create a variable opening 27 between the cone 30 and the bottom 24 of the flow-control ring 20. The plurality of springs 40 create a restoring force, wherein the variable opening 27 increases in size when a weight of grain 84 on the cone 30 moves the cone away from the bottom 24 of the flow-control ring 20 against the restoring force of the plurality of springs 40.

The flow-control ring 20 may be suspended from the grain bin opening 81 by a plurality of hooks 28. Each spring 40 may be connected between a spring-attachment ear 26 proximate the upper opening 22 of the flow-control ring 20 and a mounting point 36 on the cone. The cone 30 may include a plurality of channels 32 and a plurality of peaks 34 between the channels, each channel 32 comprising an upper surface 33. The variable opening 27 may include a plurality of gaps 29 between the bottom 24 of the flow-control ring 20 and the upper surfaces 33 of the channels 32. Each spring mounting point 36 on the cone may be proximate to one of the plurality of peaks 34, so that grain flowing in the channel is not impeded by the spring 40 or the mounting point 36.

Some embodiments may further comprise a plurality of legs 50 attached to and extending away from the cone 30, wherein each leg 50 has a first end 52 aligned with one of the plurality of channels 32. Further, each leg 50 may be pivotably attached by a hinge 56 or other means, to the cone 30 such that the angle of each leg 50 relative to the cone 30 is adjustable.

The cone 30 may be attached to an upright guide assembly 60 that is slidably positioned within the flow-control ring 20. The guide assembly 60 maintains an orientation of the cone 30 relative to the flow-control ring 20. More particularly, the guide assembly ensures that the cone, or the outer edge of the cone, is in a plane that is substantially perpendicular to the axis of the flow-control ring, so that the variable opening 27 between the bottom of the flow-control ring 20 and the cone 30, or the upper surfaces 33 of the cone's channels 32, is consistent and the same size all the way around the flow-control ring 20. The guide assembly 60 thus helps to ensure that the grain flowing in the channels 32 flows equally, or fairly equally, in each channel 32.

The guide assembly may include a plurality of upright guides 62, which may be in the form of an angle iron, pointed inward toward the center of the flow-control ring 20. The upright guides 62 may be held together to form a rigid frame by using multiple support cross bars 66 extending across the assembly through the center, or by multiple support frame members 68 that connect the upright guides 62 together with an octagonal structure. Each upright guide 62 may further comprise a contact member 64, which is typically positioned between the upright guide and the inner surface 21 of the flow-control ring 20, to reduce friction and to provide a bearing surface to allow the guide assembly 60 to move smoothly up and down within the interior of the flow-control ring 20.

B. Flow-Control Ring

Figure 9:
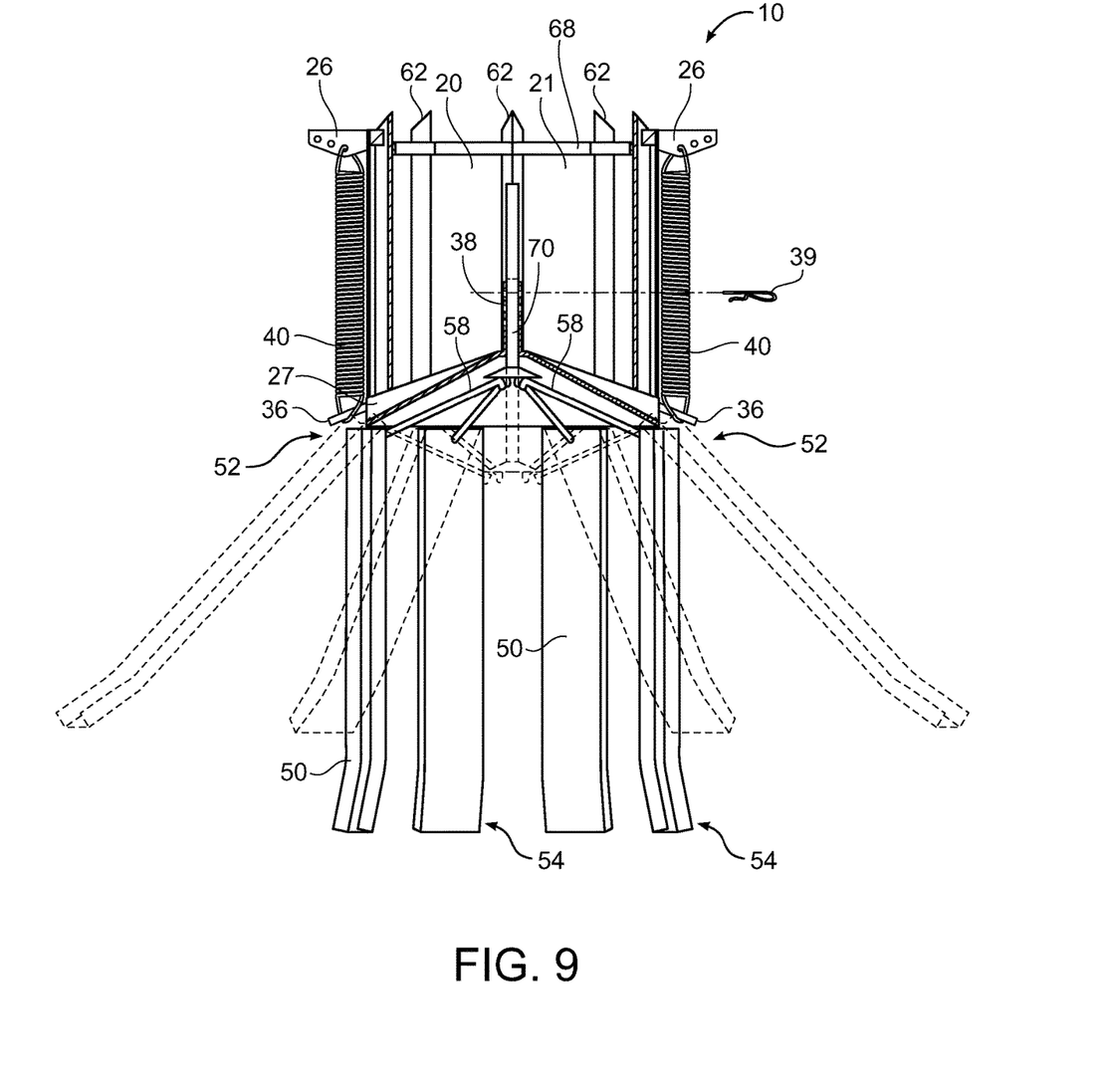
FIG. 9 is a partial section view of a grain spreading device in accordance with an example embodiment.
Figure 10:
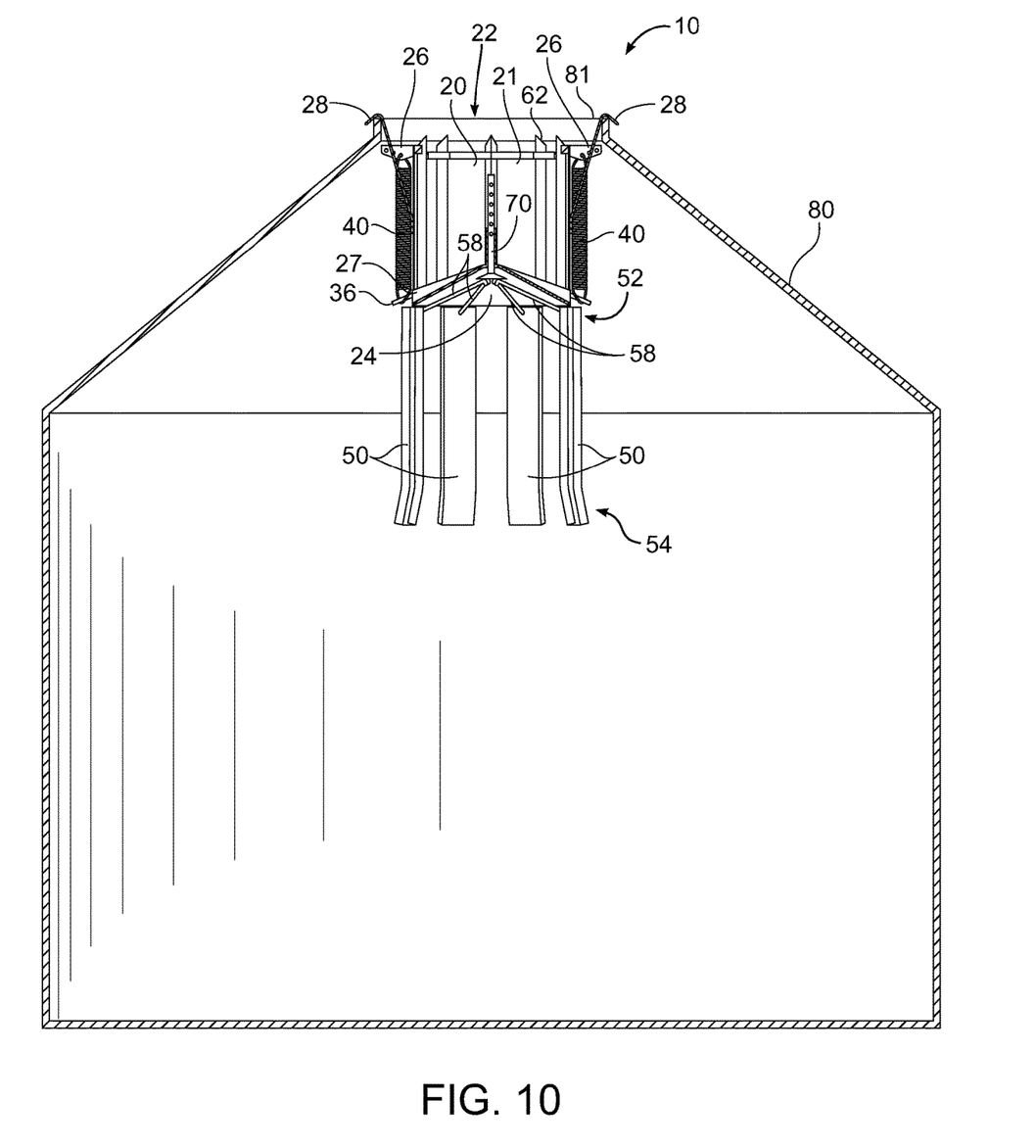
FIG. 10 is a partial section view of a grain spreading device installed for use in accordance with an example embodiment.
Figure 11:
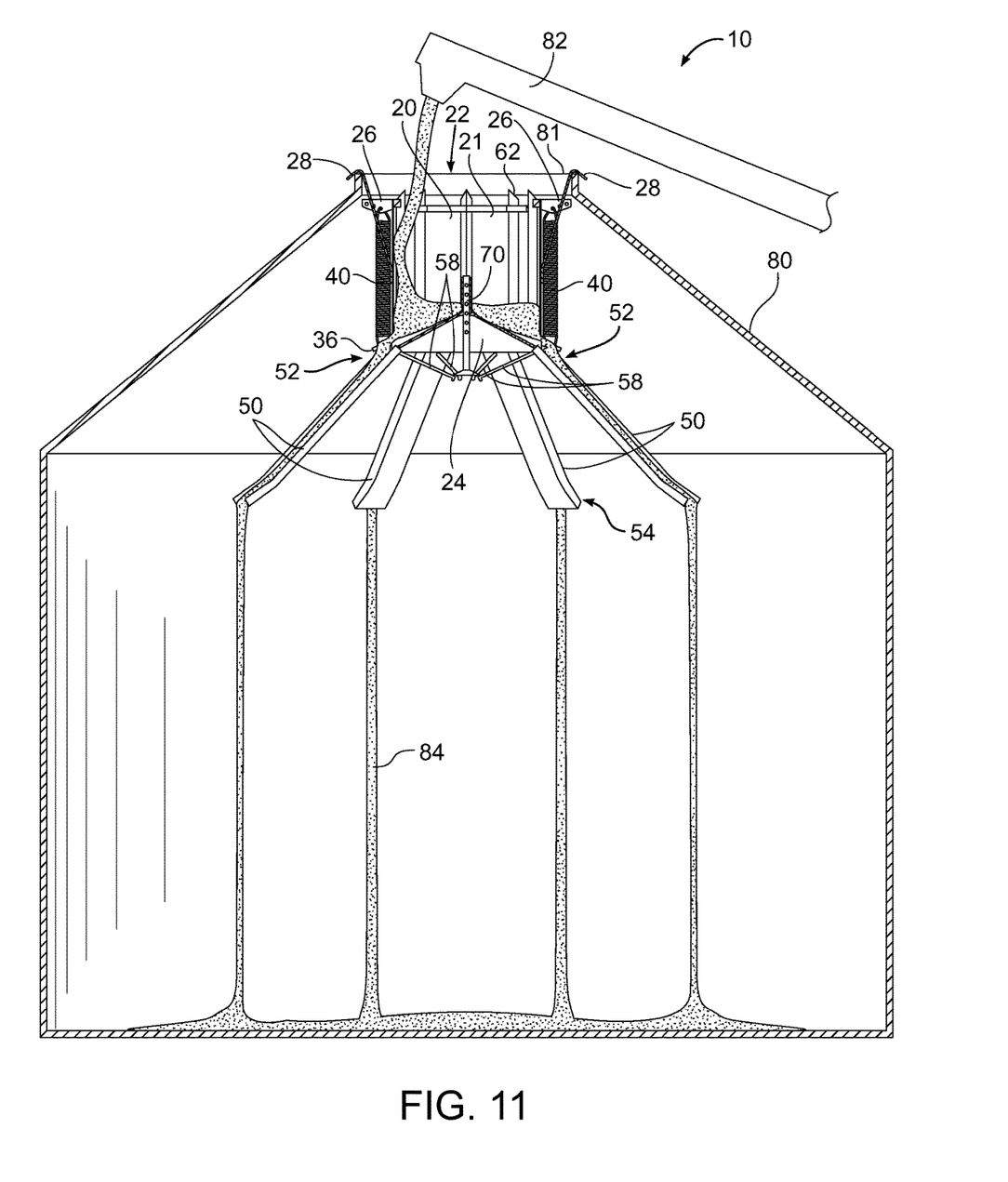
FIG. 11 is a partial section view of a grain spreading device in use in accordance with an example embodiment.
Figure 12:
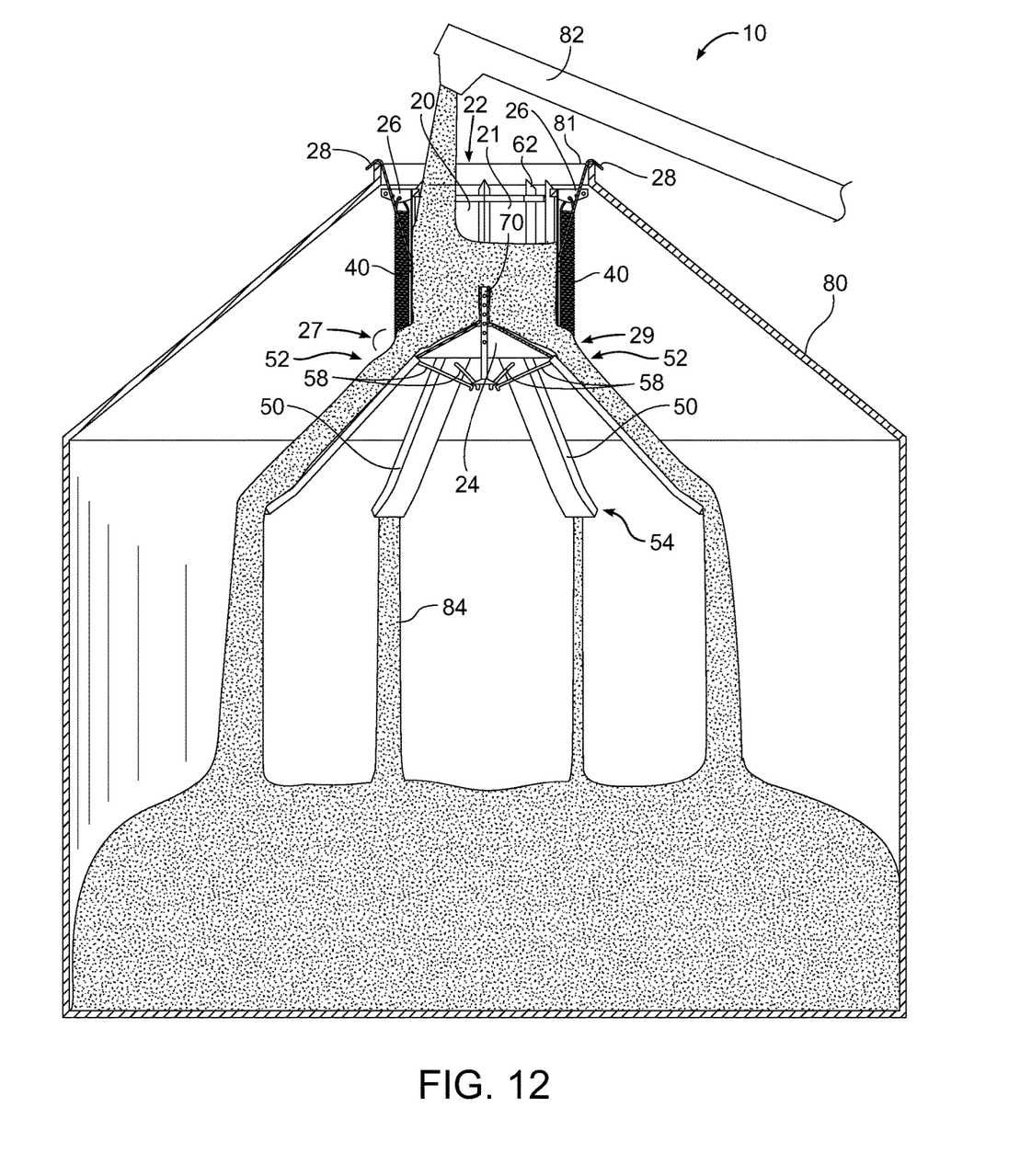
FIG. 12 is another partial section view of a grain spreading device in use in accordance with an example embodiment.

As shown in FIGS. 1-12, the grain spreading device 10 includes a flow-control ring 20 that is generally a cylindrical tube in form, although other shapes and forms are possible. The flow-control ring 20, which may also be referred to as an evenflow ring, serves to contain incoming grain 84 being delivered into a grain bin 80, and aid in the even distribution of the grain. For example, if the grain is introduced off-center, as shown in FIGS. 11 and 12, such that it hits the inner surface 21 of the flow-control ring 20, the grain will still be spread evenly in the bottom of the bin, as will be explained in detail below.

The flow-control ring 20 also serves as a base from which the grain spreading device 10 is typically suspended in a grain bin opening 81, as also shown in FIGS. 10-12. The flow-control ring 20 comprises an upper opening 22, and a plurality of spring attachment ears 26 around the top of the ring. In the embodiment shown, there are eight such attachment ears 26 evenly spaced around the flow-control ring 20, although of course different configurations and numbers of ears 26 are possible. Since the flow-control ring 20 is stationary relative to the bin opening, it provides a fixed mounting for the springs 40. Accordingly, the springs 40 provide a restoring force that normally holds the cone 30 as close to the flow-control ring 20 as it will go, with the position of the cone 30 varying and the position of the flow-control ring 20 unchanged during operation.

As best shown in FIGS. 1, 3, 7 and 8, the flow-control ring 20 may also include means for suspending the grain spreading device 10 in position directly under the grain bin opening 81, such as hooks 28 that can be attached at mounting points on the outside of the flow-control ring 20. The mounting points may comprise metal tabs with one or more holes so that a nut and bolt arrangement may be used to secure hooks 28. A nut and bolt attachment allows the hooks 28 to pivot at the attachment point, which in turn permits the grain spreading device 10 to be mounted in bins having differently sized and configured openings.

The flow-control ring 20, as mentioned, is generally in the shape of a tube, with a bottom 24 on the opposite side of the tube from the upper opening 22. The bottom 24 and the upper opening 22 may generally be parallel (such that the upper and lower edges lie in parallel planes), although to accommodate the shape of the cone 30, the bottom 24 of the flow-control ring 20 may have notches, as seen in FIGS. 7 and 8.

C. Cone and Upright Guide Assembly

Figure 7:
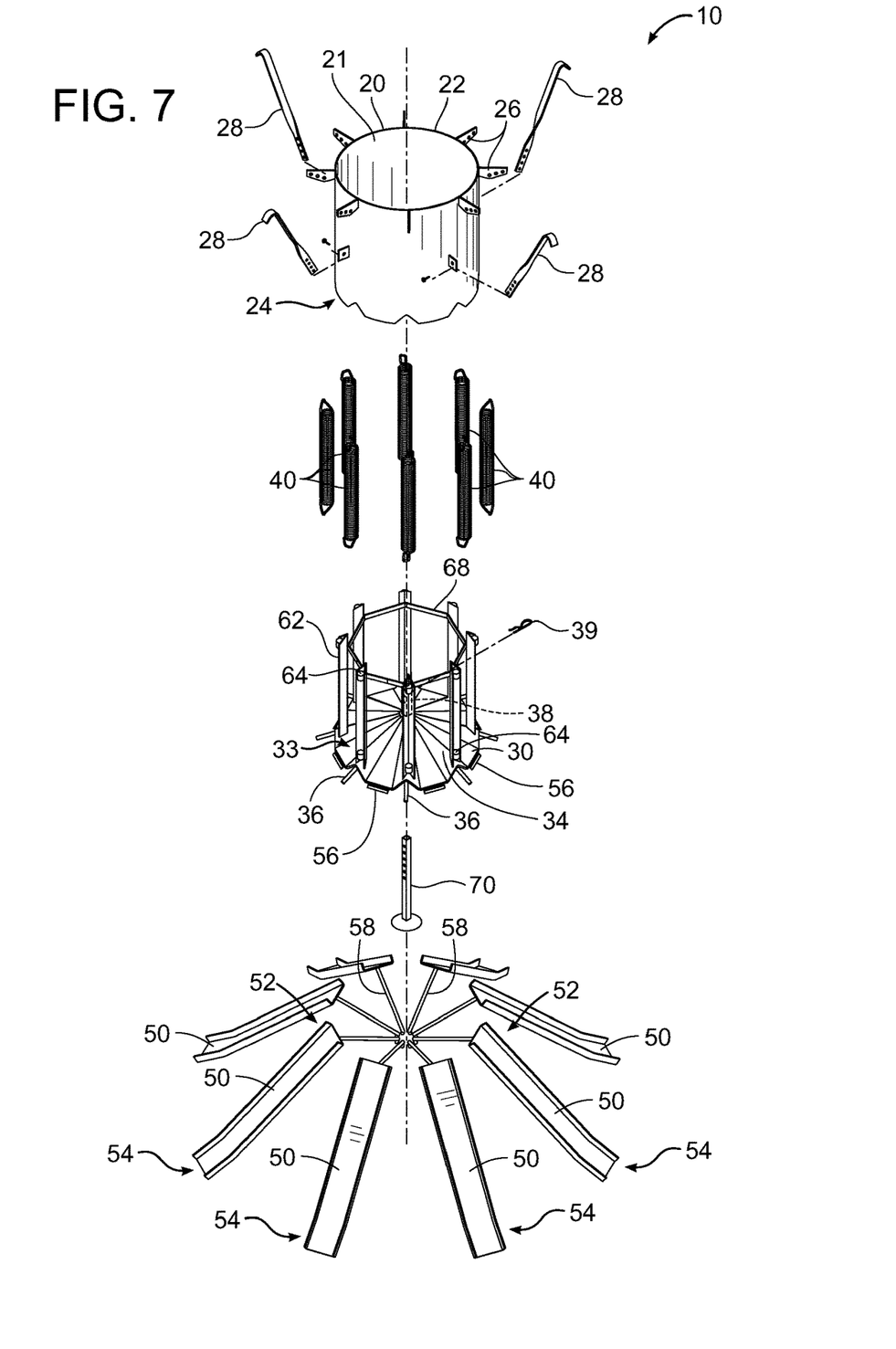
FIG. 7 is an exploded view of a grain spreading device in accordance with an example embodiment.
Figure 8:
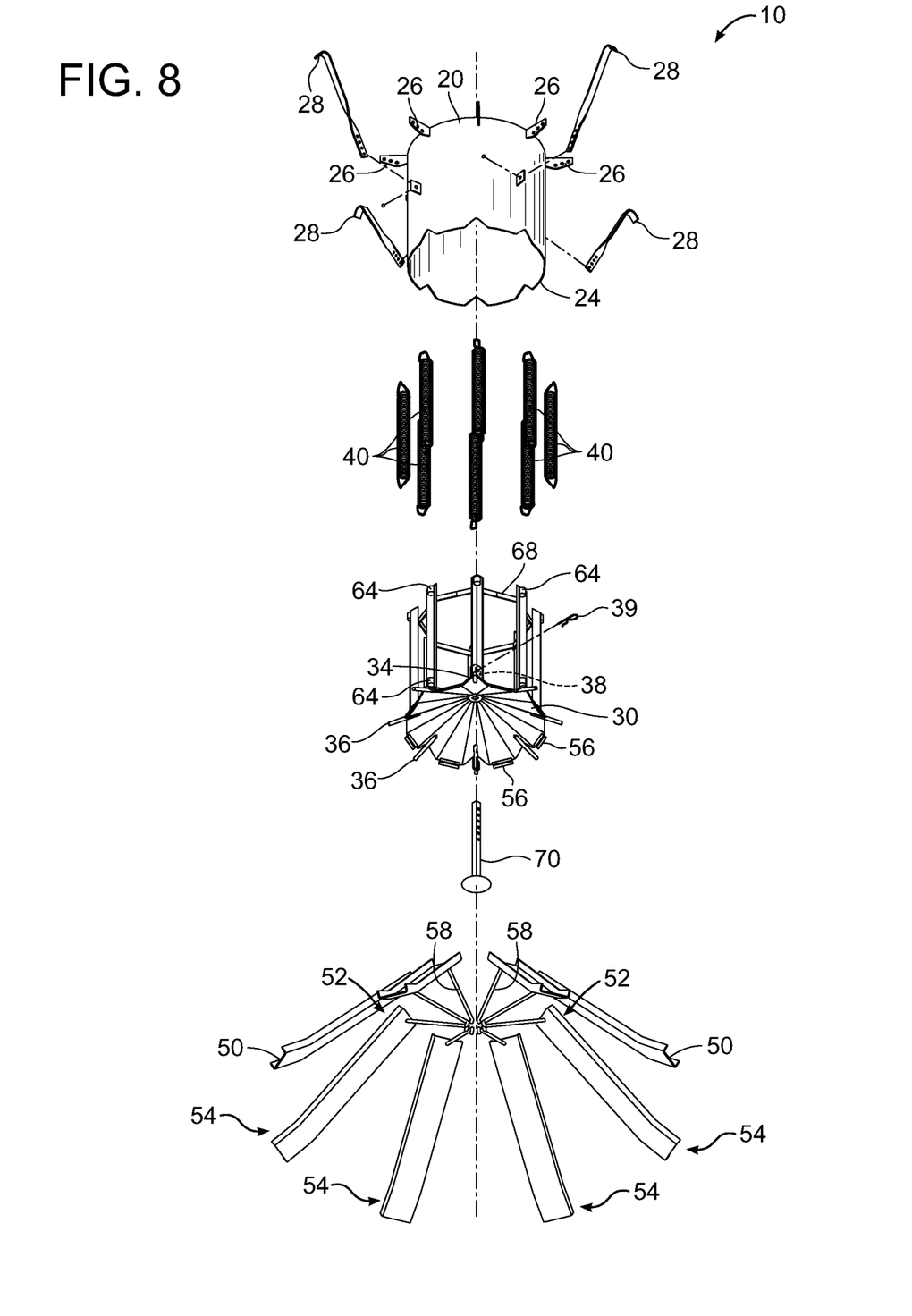
FIG. 8 is another exploded view of a grain spreading device in accordance with an example embodiment.

As best shown in FIGS. 7-8, the grain spreading device 10 also includes a cone 30 that is movably positioned near the bottom 24 of the flow-control ring 20. The cone 30 may be in the shape of an angled cone, with the point of the cone directed upwards, toward the interior of the grain spreading device 10. The cone generally comprises a plurality of channels 32, separated by peaks 34 between the channels. The channels serve to guide and carry the grain 84 as it flow through the grain spreading device 10, with the peaks tending to separate the flows and directing the grain into the channels 32. The channels 32 have an upper surface 33, over which the grain 84 will flow when the device 10 is in use.

In addition, at the outer periphery of the cone 30, near or attached to each peak 34, is a spring mounting point 36. As shown in the figures, the spring mounting points 36 are in the form of rods extending outward from the peak, such that the springs 40 and mounting points 36 will not impede or affect the flow of grain in the channels 32. Of course, other mountings are possible, such as holes through which the ends of springs 40 may pass. In the embodiment shown there are eight springs 40, eight mounting points 36, and eight spring ears 26. Other numbers of springs, as well as other configurations are also possible, and the cone 30 in the example embodiments is movably positioned below the flow-control ring 20, and guide assembly 60 is attached to the cone 30 and holds the cone's position so that it does not tilt relative to the flow-control ring 20. Since the cone 30 does not tilt, and is guided as it slides up and down relative to flow-control ring 20, the movement of the cone will create a variable sized opening 27 between the cone and the bottom of the flow-control ring 20, and the opening has substantially the same distance and characteristic all the way around the bottom of the flow-control ring 20.

Figure 2:
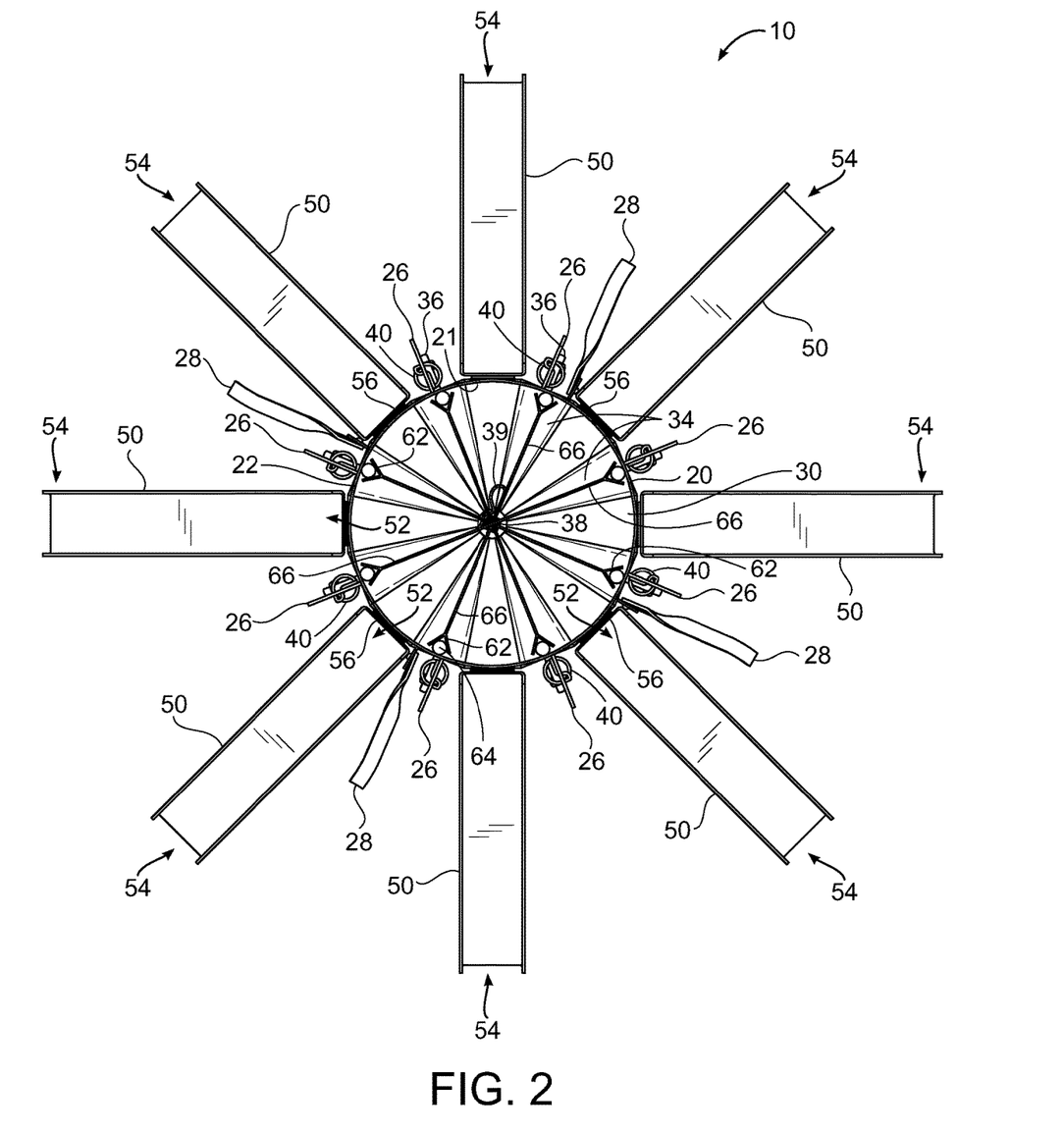
FIG. 2 is a top view of a grain spreading device in accordance with an example embodiment.
Figure 4:
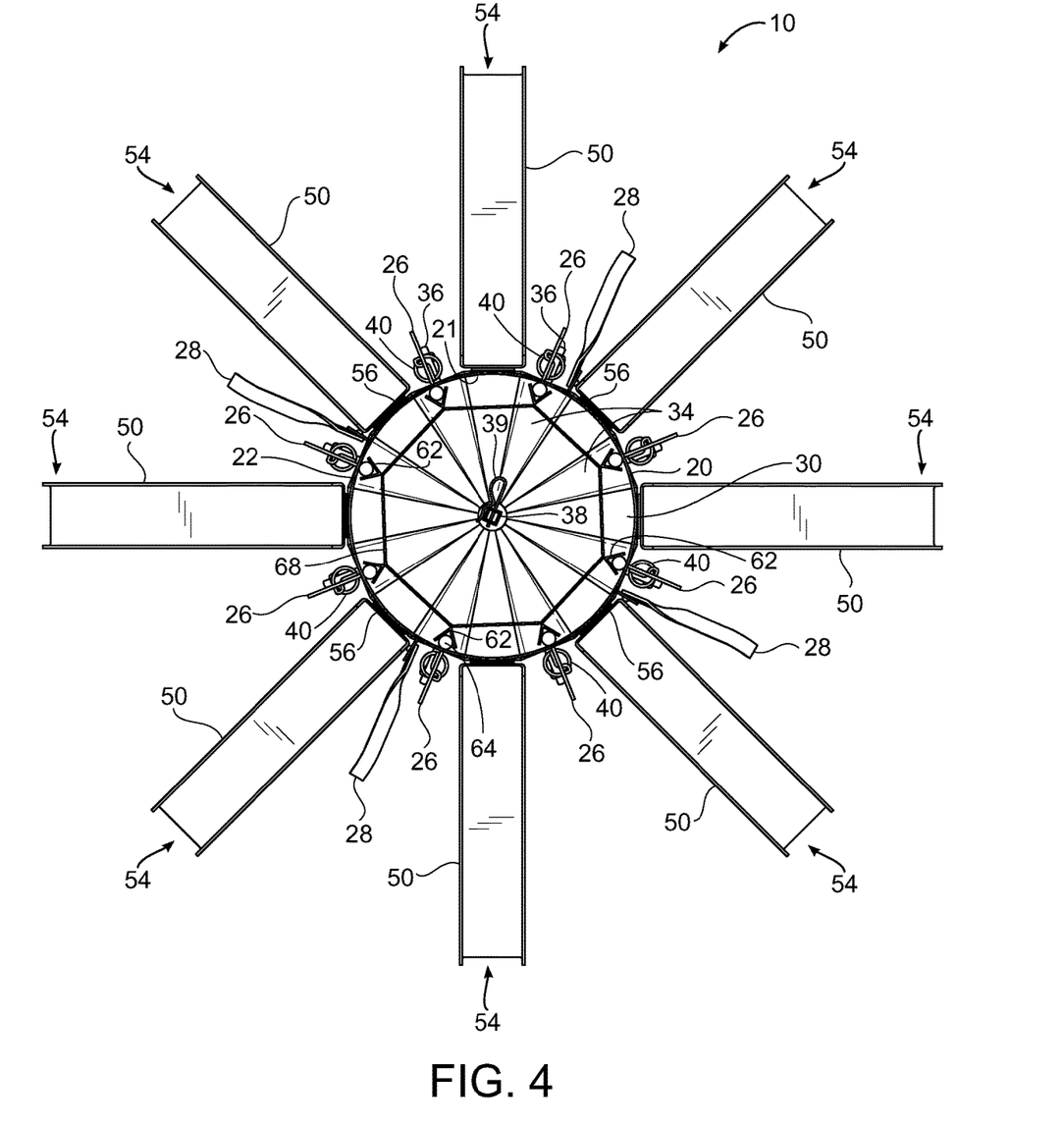
FIG. 4 is a top view of a grain spreading device in accordance with another example embodiment.

As mentioned, the cone 30 is securely mounted to an upright guide assembly 60 that fits slidably inside the flow-control ring 20. The guide assembly 60 has a number of contact members 64, which may be plastic, nylon, or other hard, low-friction material that allows the upright guide assembly 60 to slide freely up and down within the flow-control ring 20. As shown in FIGS. 2 and 4, the contact members 64 are positioned between the individual upright guides 62 and the inner surface 21 of flow-control ring 20. The contact members may be attached to the upright guides 62, which may be angle iron sections that easily accommodate the contact members 64, and also provide the appropriate rigidity to the guide assembly 60.

Figure 1:
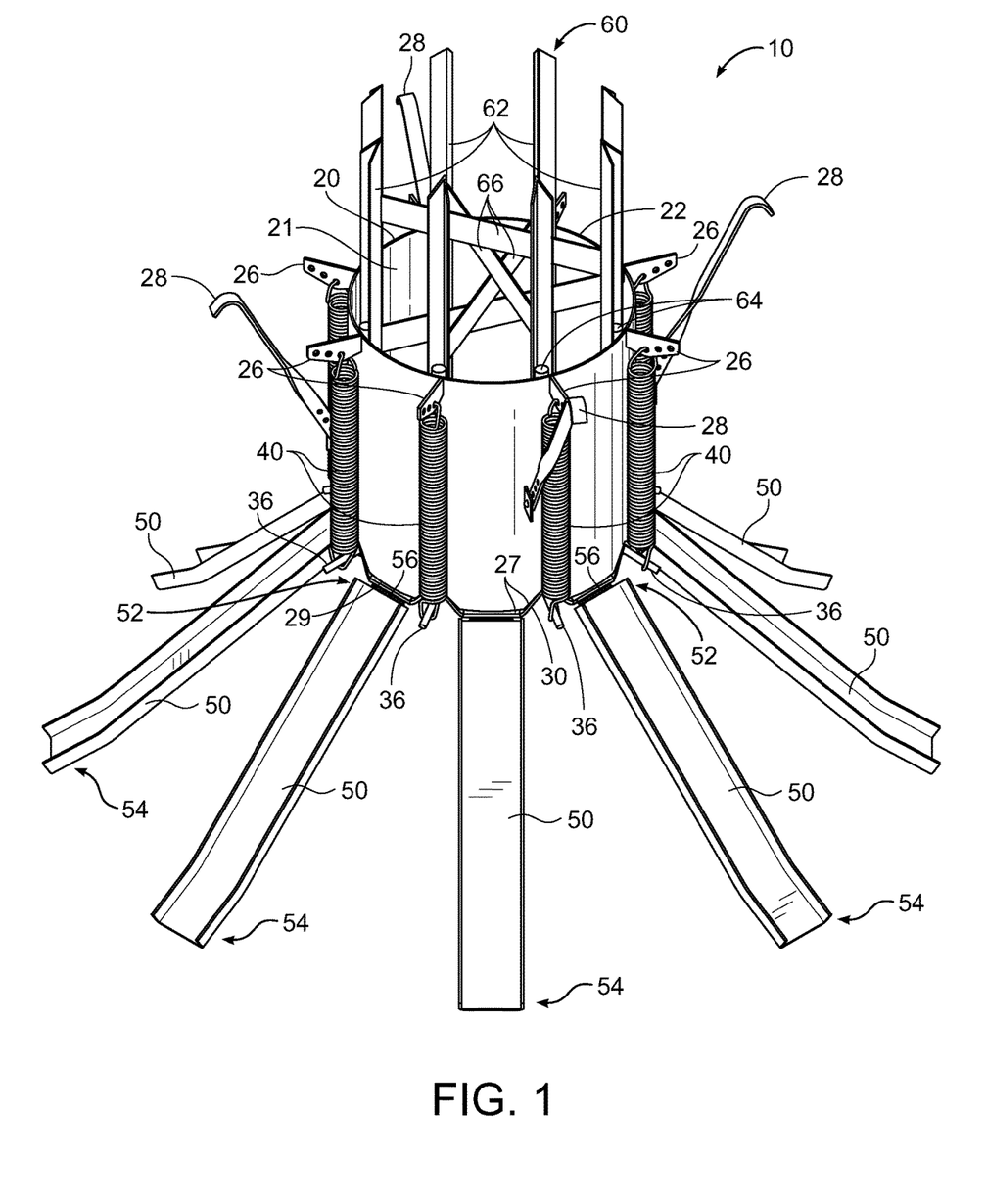
FIG. 1 is a perspective view of a grain spreading device in accordance with an example embodiment.
Figure 3:
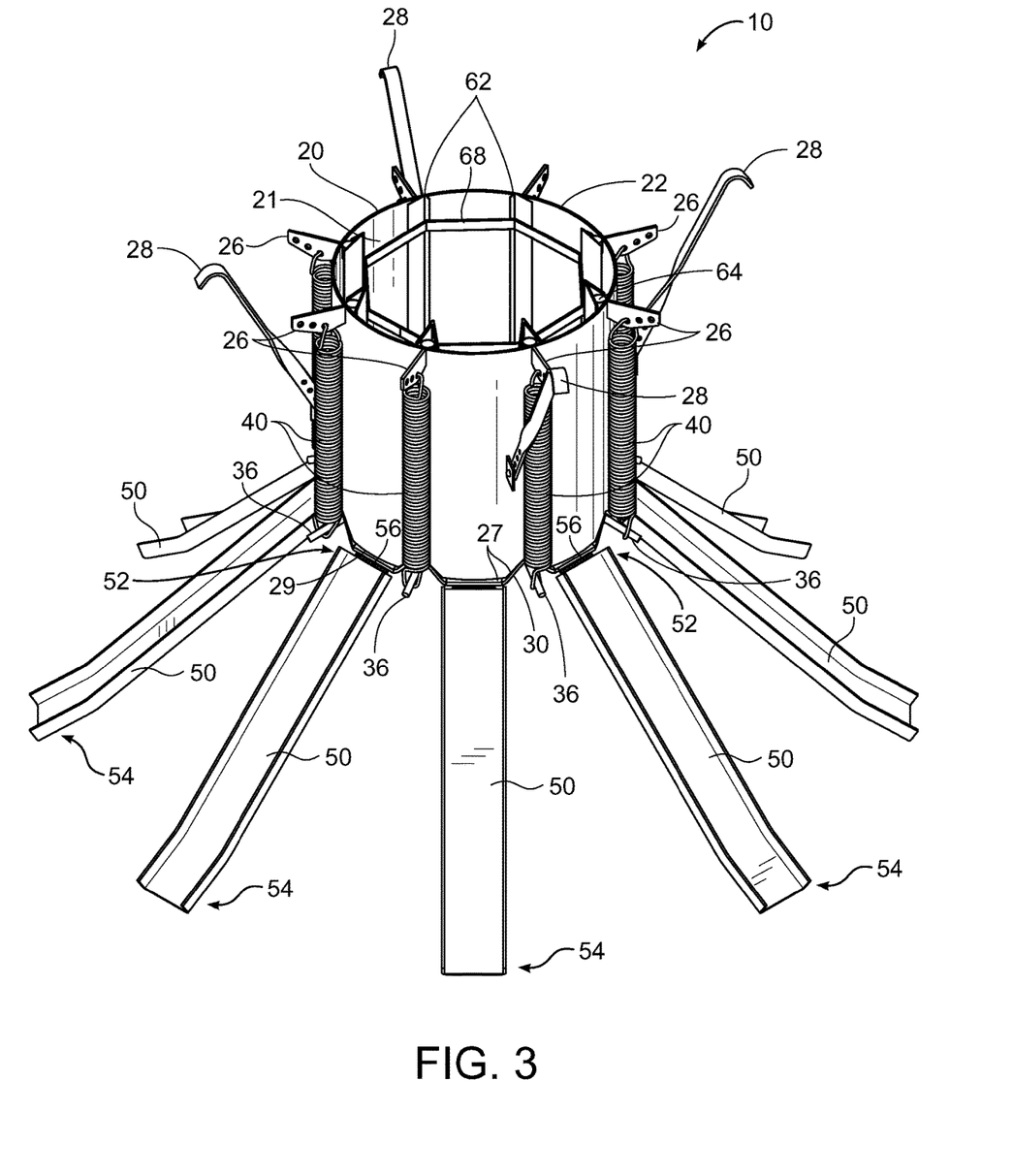
FIG. 3 is perspective view of a grain spreading device in accordance with another example embodiment.

The upright guides 62 are connected to each other, and held in a rigid frame, by either support cross bars 66, as shown in the embodiment of FIGS. 1-2, or by support frame members 68, shown in subsequent figures, and best shown in FIGS. 3 and 4. In the latter embodiment, the frame members 68 (of which there may be multiple sets) from an octagonal frame that leaves the center of the grain spreading device 10 open to receive and hold grain 84, as also shown in FIGS. 11-12, although the device 10 will also function with either of the guide configurations, or a different configuration that holds the upright guides 62 in position.

A plurality of legs 50 may also be attached with hinges 56 to the cone 30, with the legs 50 being aligned with the channels 32 of the cone, so that grain flowing in the channels 32 will continue to flow onto the associated legs 50, from a first end 52 of each leg, to a second end 54 of each leg, and from there into the grain bin. As best shown in FIGS. 9 and 10, the legs 50 each have attached to their undersides a kicker arm 58, which serves as a lever to allow for the adjustable positioning of the legs 50. Specifically, the bottom of plunger 70 can be pushed down, which in turn pushes down on the ends of kicker arms 58, causing the legs 50 to pivot about hinges 56 and to extend outward and away from cone 30.

The center of cone 30 may include a plunger guide 38, as shown in FIGS. 7 and 8, which may be in the form of a square tube with a number of holes aligned across the tube. Plunger 70 may also include a square center rod with a number of holes cross drilled through it. This arrangement allows the plunger 70 to be positioned at various lengths extending from the bottom of the cone 30, and then locked into place with a hairpin 39 inserted through the appropriate holes in the guide 38 and the plunger 70. Accordingly, the legs 50 are easily and readily adjustable with arms 58, hinges 56, and the plunger 70, to allow the grain spreading device 10 to work well in bins 80 of various diameters. FIG. 9 illustrates the legs 50 in both a relaxed and an extended position.

D. Operation of Preferred Embodiment

In use, the grain spreading device 10 allows for a self-regulating spreading of grain, which works well independent of the flow rate of grain into the bin. Further, the device also accomplishes even distribution even if grain is poured into the bin by an off-center auger 82, or with a flow that is not straight down into the grain spreading device 10. This is illustrated in FIGS. 11 and 12.

A grains spreading device similar to that shown in the figures, but without regulating springs 40, will work to distribute grain evenly, but typically must be set up with an opening around the perimeter at the bottom of a ring is optimized for a particular flow rate. This can be a problem if different equipment or a different operator causes grain to be poured into the bin at a different rate. For example, if the rate is lower, and the opening is relatively large, an off-center introduction of grain may result in most of the grain flowing down just a few of the legs, or even a single leg, defeating the purpose of the spreader. This happens because the opening may be large enough that all the grain can exit from the opening toward one side of the spreader before the grain accumulates within the flow-control ring so that a fairly equal amount of grain flow into all the channels.

If, on the other hand, the flow rate of the grain is much higher than the spreader opening has been adjusted for, the grain may fill the ring before it can all flow out the proper channels and legs, and simply spill over the top of the ring and into the center of the bin, again defeating the purpose of the spreader.

Both scenarios are undesirable, as an uneven piling of grain within a bin, and especially the fines in the grain, can cause issues with even cooling and drying of the grain, due to uneven and impeded air flow.

Figure 5:
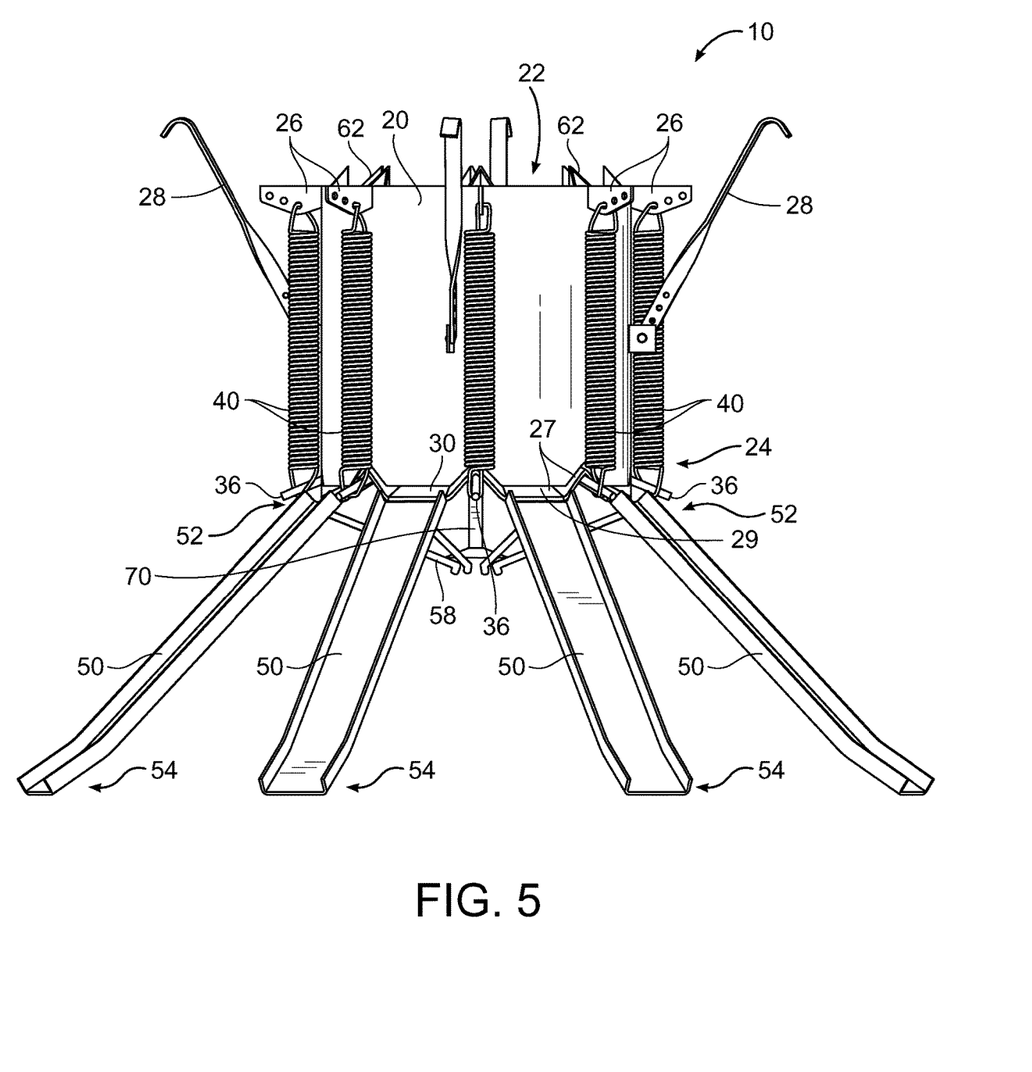
FIG. 5 is a side view of a grain spreading device in accordance with an example embodiment.

The spring-regulated device disclosed here prevents these problems, by making the spreader 10 self-regulating. For example, as best shown in FIGS. 5 and 11, when there is little or no grain within the flow-control ring 20, the restoring force of the springs 40 will hold the cone 30 as far up as it can go, and the design, size, and shape of the cone 30 is such that there will still remain small individual gaps 29 between the upper surfaces 33 of the channels 32 and the bottom of the flow-control ring 20. These gaps 29, collectively, comprise a variable opening 27 at the bottom of the device, through which grain can flow. However, the opening 27 is small enough that even an off-center, low rate flow of grain will not simply flow out one side of the device, but will instead pile up inside the flow-control ring 20, as shown in FIG. 11.

In this state, since the grain 84 is now in fairly equal height above each gap 29, it will flow equally through the channels 32 all the way around the grain spreading device 10 and evenly distributed into the bottom of the bin 80, as shown.

Figure 6:
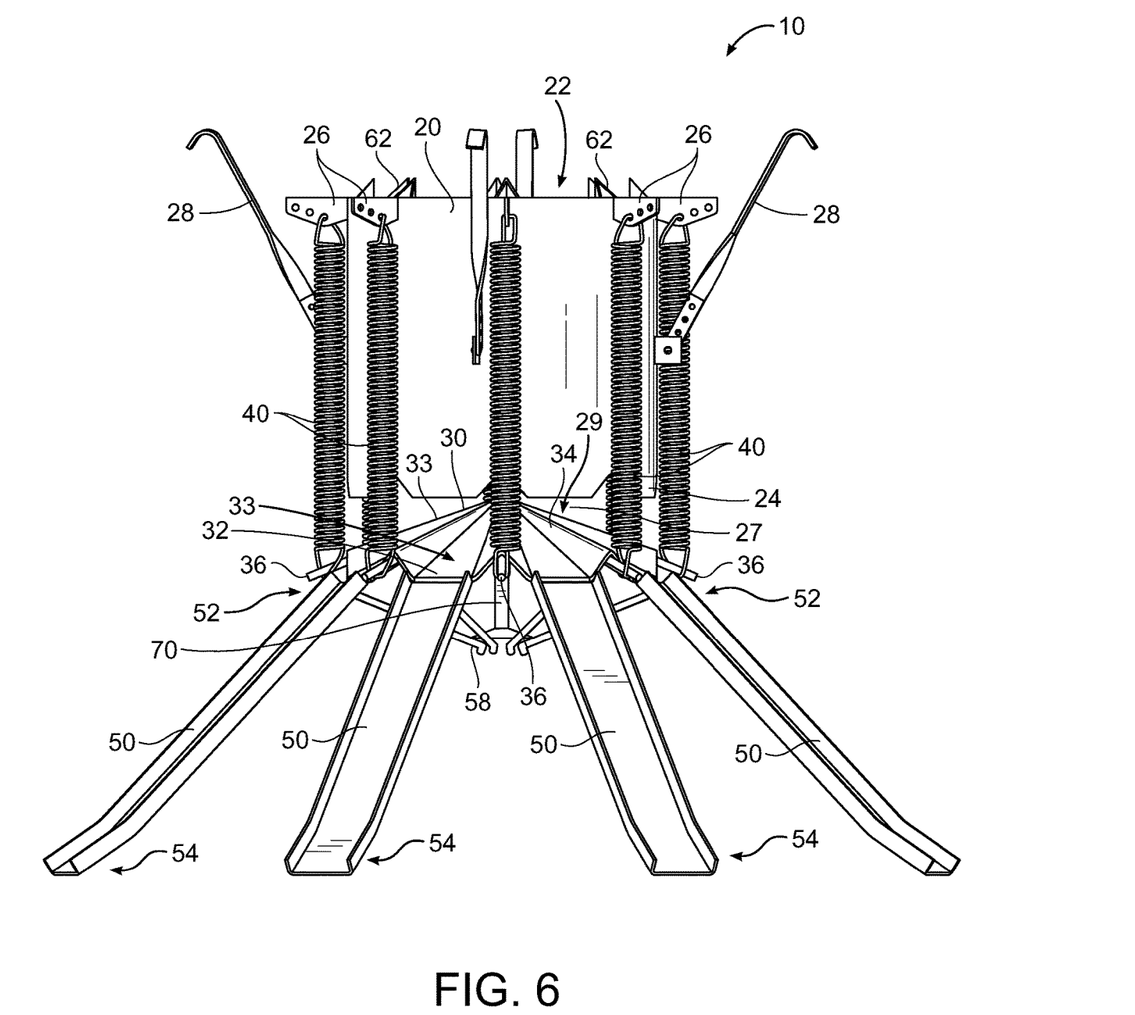
FIG. 6 is another side view of a grain spreading device in accordance with an example embodiment.

FIGS. 6 and 12 illustrate the condition of the spreading device 10 when there is a high flow rate. In this condition, the weight of the grain 84 acting against the force of springs 40, pushes the cone 30 down, creating a much larger variable opening 27, and corresponding gaps 29 between the upper surfaces 33 of the cone 30 and the bottom of the flow-control ring 20. This larger opening, as contrasted with a fixed opening, is regulated by the springs 40, such that it allows a high flow of grain 84 to flow over the cone 30 in channels 32 and onto legs 50. With appropriate spring force, the opening 27 and gaps 29 will be sufficient to prevent the grain from entirely filling the flow-control ring 20 and spilling over the top. This operational condition is illustrated in FIG. 12, which again results in the grain 84 being distributed evenly over the bottom of bin 80.

As shown for example in FIGS. 5 and 6, the spring attachment ears 26 may have spring attachment holes at different distances away from mounting points 36 on the cone, such that the spring force and threshold at which the cone begins to move can be adjusted, simply by attaching the springs at different points on the ears 26.

Unless otherwise defined, all technical and scientific terms used herein have the same meaning as commonly understood by one of ordinary skill in the art to which this invention belongs. Although methods and materials similar to or equivalent to those described herein can be used in the practice or testing of the grain spreading device, suitable methods and materials are described above. All publications, patent applications, patents, and other references mentioned herein are incorporated by reference in their entirety to the extent allowed by applicable law and regulations. The grain spreading device may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A grain-spreading device, comprising:
   a ring adapted to be positioned below a grain bin opening of a grain bin, the ring comprising an upper opening and a bottom;
   a cone movably suspended below the ring by a plurality of springs to create a variable opening between the cone and the bottom of the ring, wherein the cone comprises a plurality of channels, wherein the plurality of springs create a force applied to the cone, and wherein the variable opening increases in size when a weight of grain on the cone moves the cone away from the bottom of the ring against the force of the plurality of springs;
   a plurality of guides extending upwardly from the cone, wherein the plurality of guides are slidably positioned with respect to the ring; and
   a plurality of legs attached to and extending away from the cone, wherein each of the plurality of legs is aligned with one of the plurality of channels.

2. The grain-spreading device of claim 1, further comprising a plurality of hooks connected to the ring to suspend the ring from the grain bin below the grain bin opening.

3. The grain-spreading device of claim 1, wherein the variable opening comprises a plurality of gaps between the bottom of the ring and the plurality of channels.

4. The grain-spreading device of claim 1, wherein each of the plurality of legs is pivotably attached to the cone such that an angle of each of the plurality of legs relative to the cone is adjustable.

5. The grain-spreading device of claim 4, wherein each of the plurality of legs is pivotably attached to the cone by a corresponding hinge.

6. The grain-spreading device of claim 4, further comprising an adjustment assembly connected to the plurality of legs to adjust the angle of each of the plurality of legs relative to the cone.

7. A grain-spreading device, comprising:
   a ring adapted to be positioned below a grain bin opening of a grain bin, wherein the ring comprises an upper opening and a bottom; and
   a cone movably suspended below the ring by a plurality of springs to create a variable opening between the cone and the bottom of the ring, wherein the plurality of springs create a force applied to the cone, and wherein the variable opening increases in size when a weight of grain on the cone moves the cone away from the bottom of the ring against the force of the plurality of springs; and
   a plurality of guides extending upwardly from the cone, wherein the plurality of guides are slidable with respect to the ring to maintain an orientation of the cone relative to the ring.

8. The grain-spreading device of claim 7, further comprising a plurality of legs attached to and extending away from the cone.

9. The grain-spreading device of claim 7, further comprising a plurality of hooks connected to the ring to suspend the ring from the grain bin below the grain bin opening.

10. The grain-spreading device of claim 7, wherein the cone comprises a plurality of channels.

11. The grain-spreading device of claim 10, wherein the variable opening comprises a plurality of gaps between the bottom of the ring and the plurality of channels.

12. The grain-spreading device of claim 7, wherein the plurality of guides are positioned on an interior of the ring.

13. A grain-spreading device, comprising:
   a ring adapted to be positioned below a grain bin opening, the ring comprising an upper opening and a bottom;
   a cone movably suspended below the ring by a plurality of springs to create a variable opening between the cone and the bottom of the ring, wherein the variable opening increases in size when a weight of grain on the cone moves the cone away from the bottom of the ring against a force of the plurality of springs;
   a plurality of guides extending upwardly from the cone, wherein the plurality of guides are slidably positioned with respect to the ring; and
   a plurality of legs attached to and extending away from the cone.

14. The grain-spreading device of claim 13, wherein the cone comprises a plurality of channels.

15. The grain-spreading device of claim 13, further comprising a plurality of hooks connected to the ring to suspend the ring from the grain bin below the grain bin opening.

16. The grain-spreading device of claim 13, wherein the variable opening comprises a plurality of gaps between the bottom of the ring and the plurality of channels.

17. The grain-spreading device of claim 13, wherein each of the plurality of legs is pivotably attached to the cone such that an angle of each of the plurality of legs relative to the cone is adjustable.

18. The grain-spreading device of claim 17, wherein each of the plurality of legs is pivotably attached to the cone by a corresponding hinge.

19. The grain-spreading device of claim 17, further comprising an adjustment assembly connected to the plurality of legs to adjust the angle of each of the plurality of legs relative to the cone.

20. The grain-spreading device of claim 13, further comprising a plurality of hooks connected to the ring to suspend the ring from the grain bin below the grain bin opening.

\* \* \* \* \*